United States Patent
Chen et al.

(10) Patent No.: US 9,939,124 B1
(45) Date of Patent: Apr. 10, 2018

(54) LIGHT MASK TYPE OPTICAL DEVICE

(71) Applicant: TSAIZE TECHNOLOGY CO., LTD., Taoyuan (TW)

(72) Inventors: You-Tung Chen, Taoyuan (TW); Yun-Jung Tsai, Taoyuan (TW)

(73) Assignee: TSAIZE TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 15/607,432

(22) Filed: May 27, 2017

(30) Foreign Application Priority Data

Feb. 17, 2017 (TW) .............................. 106105188 A

(51) Int. Cl.
*F21V 7/04* (2006.01)
*F21V 3/04* (2018.01)
*F21V 8/00* (2006.01)
*F21Y 103/00* (2016.01)

(52) U.S. Cl.
CPC ............ *F21V 3/049* (2013.01); *G02B 6/0065* (2013.01); *F21Y 2103/00* (2013.01)

(58) Field of Classification Search
USPC .................... 362/619, 516, 296.01, 297, 309
See application file for complete search history.

(56) References Cited

U.S. PATENT DOCUMENTS

| | | | | |
|---|---|---|---|---|
| 3,721,818 A | * | 3/1973 | Stahlhut | F21V 5/00 362/297 |
| 2005/0007596 A1 | * | 1/2005 | Wilks, Jr. | G01N 21/255 356/436 |

* cited by examiner

*Primary Examiner* — Vip Patel
(74) *Attorney, Agent, or Firm* — Chun-Ming Shih

(57) ABSTRACT

A light mask type optical device includes an optical element. The optical element is formed by a light inlet face, a light outlet face opposite to the light inlet face, and a plurality of grating structures of micro meter (μm) scale disposed on the light outlet face. The grating structure includes a first slant face, a second slant face, and a plane surface between the first slant face and the second slant face. In application, a direct downward light emitted by a light source is reflected by the first slant face and the second slant face, to form a circulating light in the grating structure, and that is combined with the direct downward light to output from the light outlet face in achieving reduced glare and increased lumen in application.

10 Claims, 7 Drawing Sheets

10

LIGHT MASK TYPE OPTICAL DEVICE

BACKGROUND OF THE INVENTION

Field of the Invention

The present invention relates to an optical device capable of reducing glare, and in particular to a light mask type optical device capable of reducing glare while increasing lumen.

The Prior Arts

The conventional light fixture tends to produce strong glare, since the lights emitted from a small area of a light source (such as light bulb, light tube, or LED) are dazzling. To redress this problem, the conventional light fixture utilizes grating structure to shield the point light source from the human eye to reduce glare. However, in utilizing grating structure, low intensity glare still remains.

Further, in order to overcome the shortcomings mentioned above, presently on the market, a light mask structure capable of reducing glare is available. For this type of light mask structure, the coating of a layer of light blocking powder is applied onto the light mask, to prevent glare from happening. Though, this type of structure may reduce the glare produced, but it may diminish the luminance of light significantly.

Therefore, presently, the design and performance of optical device is not quite satisfactory, and it leaves much room for improvement.

SUMMARY OF THE INVENTION

In view of the problems and drawbacks of the prior art, the present invention provides a light mask type optical device capable of reducing glare while increasing lumen.

The major objective of the present invention is to provide a light mask type optical device, that includes an optical element made of transparent plastic material, and it includes: a smooth light inlet face; a smooth light outlet face opposite to the light inlet face; and a plurality of grating structures of micro meter (μm) scale, disposed on the light outlet face. Each of the grating structures includes a first slant face, a second slant face, and a plane surface located between the first slant face and the second slant face, to form into an inverted trapezoid. Wherein, in application, light is emitted from a light source right above the light inlet face, a part of the light is output from the light outlet face, while the other part of the light is reflected by the first slant face and the second slant face, to form into a circulating light in the grating structure, and that is combined with the direct downward light, to impinge onto the light outlet face. As such, the incident light is enhanced by the sideway light, to be concentrated to the center of the light outlet face, in achieving reduced glare and increased lumen in application.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
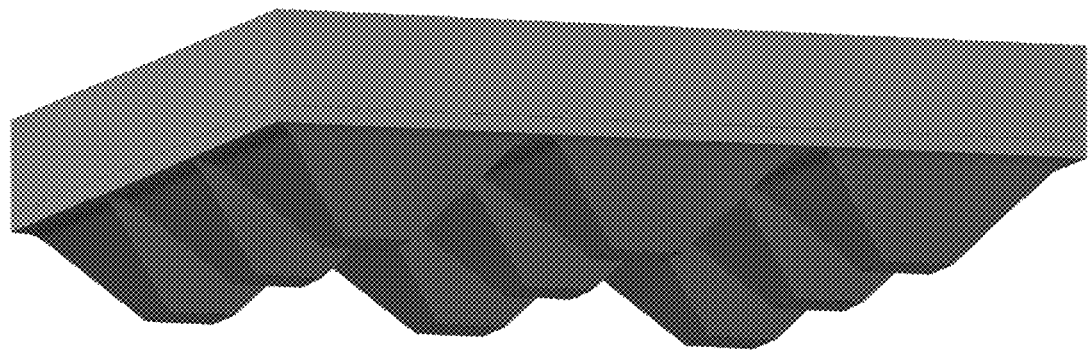
FIG. 1 is a perspective view of a light mask type optical device according to an embodiment of the present invention.

Firstly, refer to FIG. 1 for a perspective view of a light mask type optical device according to an embodiment of the present invention. As shown in FIG. 1, the light mask type optical device includes an optical element 10, made of transparent plastic material having transmittance of over 60%, and is formed by injection molding or extrusion molding. Wherein, the transparent plastic material is Polystyrene (PS), Polycarbonate (PC), Polypropylene (PP.), or acrylic.

Figure 2:
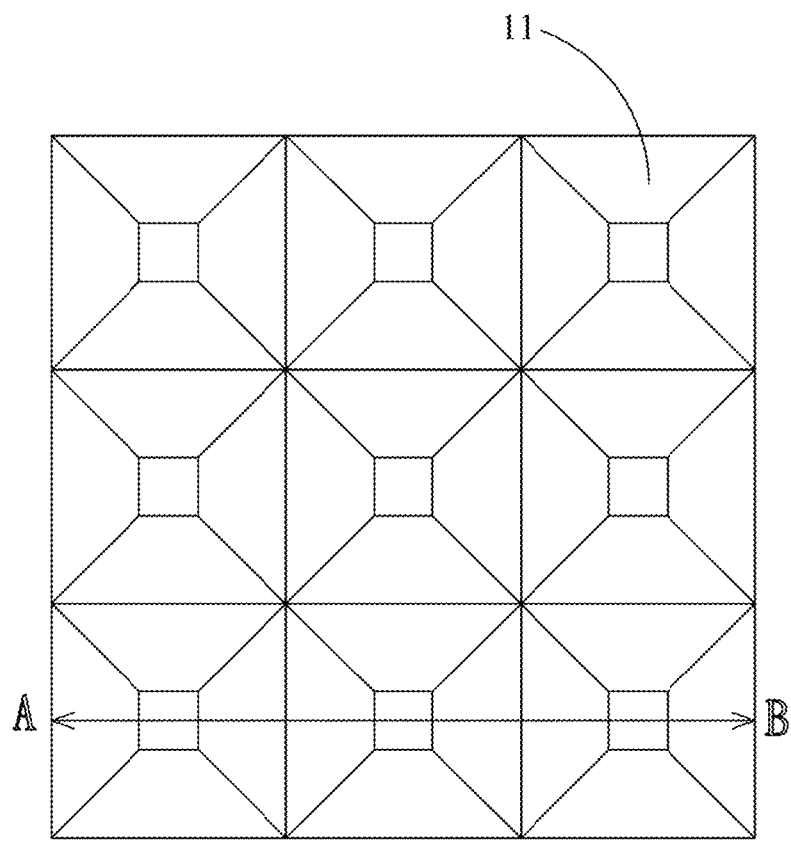
FIG. 2 is a top view of a light mask type optical device according to an embodiment of the present invention.
Figure 3:
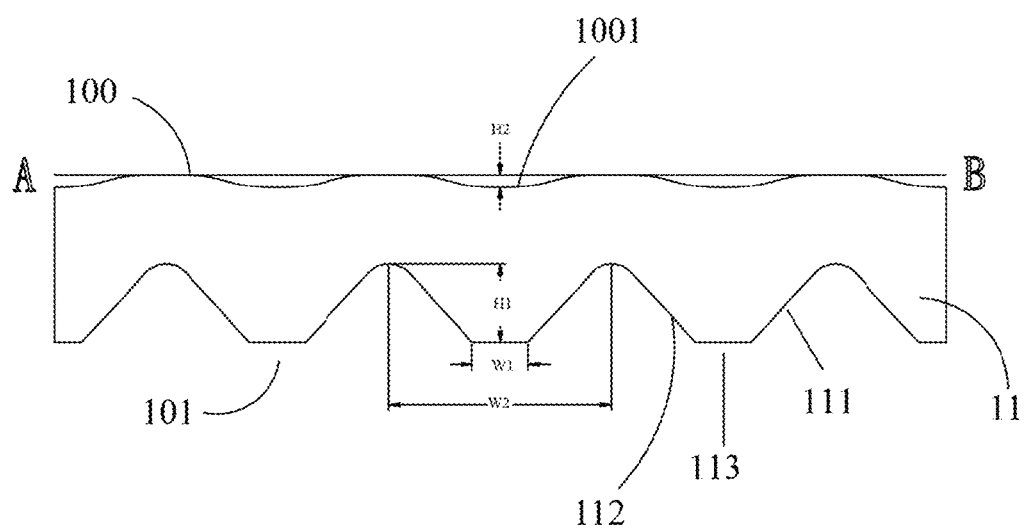
FIG. 3 is a cross section view of a light mask type optical device according to an embodiment of the present invention.

Next, refer to FIGS. 2 and 3 respectively for a top view of a light mask type optical device according to an embodiment of the present invention; and a cross section view of a light mask type optical device according to an embodiment of the present invention. As shown in FIGS. 2 and 3, the optical element 10 includes: a smooth light inlet face 100, a smooth light outlet face 101 opposite to the light inlet face 100, and a plurality of grating structures 11 of micro meter (μm) scale, disposed on the light outlet face 100. On the light inlet face 100 opposite the grating structures 11 is formed an indent portion 1001, while each of the grating structures 11 includes a first slant face 111, a second slant face 112, and a plane surface 113 located between the first slant face 111 and the second slant face 112, to form into an inverted trapezoid. The light inlet face 100 and the light outlet face 101 are both Anti Glaring (AG) Atomized faces, to shield the light source such as light bulb, light tube, and LED lamp behind the optical element 10.

As shown in FIG. 3, the grating structure 11 of μm scale is formed having the following parameters: a first width W1 for the width of the plane surface 113 being 0.15 mm-0.85 mm, a second width W2 for the width of the grating structure 11 being 1 mm-3 mm; the first height H1 for the height of the grating structures 11 being 0.35 mm-1.05 mm; while the second height H2 for the height of the indent portion 1001 being 0.02 mm-0.08 mm.

Figure 4:
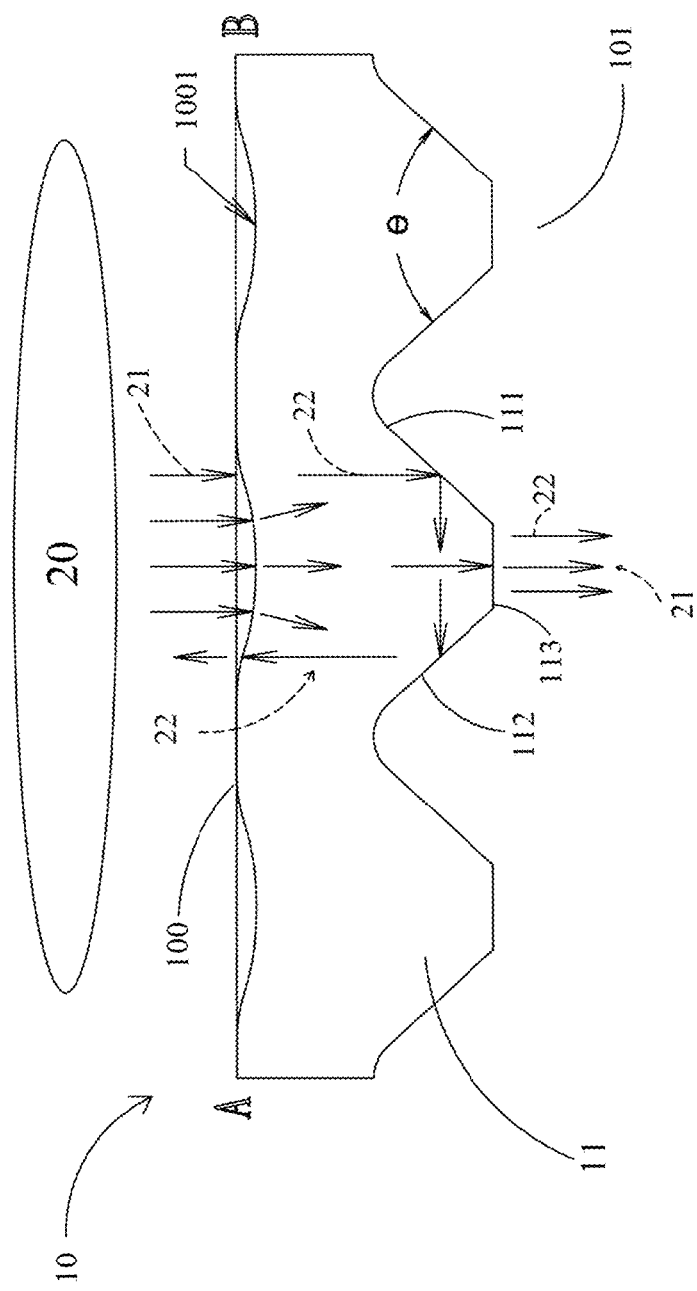
FIG. 4 is a cross section view of a light mask type optical device in an application according to an embodiment of the present invention.

Then, refer to FIG. 4 for a cross section view of a light mask type optical device in application according to an embodiment of the present invention. As shown in FIG. 4, in application, light is emitted from a light source 20 above the light inlet face 100. A part of the light is output from the light outlet face 101, while the other part of the light is reflected by the first slant face 111 of the grating structure 11 to form into a circulating light 22, and that is in turn reflected by the second slant face 112, to travel back to the light source 20. Then, the circulating light 22 is combined with the direct downward light 21, to repeat the steps mentioned above, and finally output from the light outlet face 101.

Also, refer again to FIG. 4, in application, the light ejected from the light inlet face 100 having transmittance of 30% to 55%, the light ejected from the light outlet face 101 having transmittance of 80% to 100%, while the rest of the lights are circulated in the grating structure 11. In this way, the scattered lights are gathered and concentrated into circulating light 22 through multi reflections, to combine with the direct downward light 21. As such incident light is enhanced by the sideway light, to be concentrated to the center of the light outlet face 101, in achieving increased lumen by 10%, while reducing glares significantly. Further, in order to achieve light circulation in grating structure 11, the angle θ between the first slant face 111 and the second slant face 112 can be set from 70 to 100 degrees.

Figure 5:
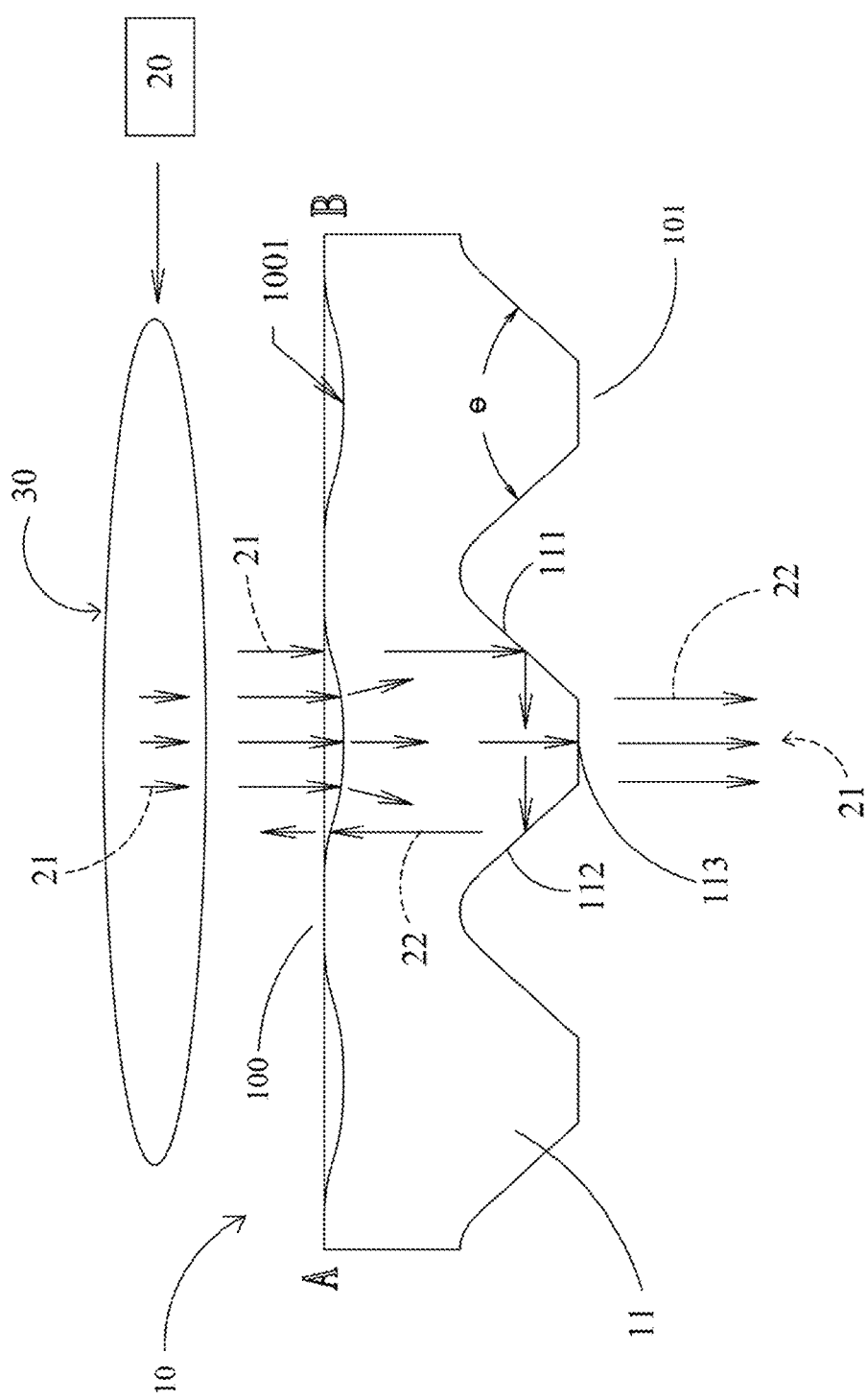
FIG. 5 is a cross section view of a light mask type optical device in another application according to an embodiment of the present invention.

Subsequently, refer to FIG. 5 for a cross section view of a light mask type optical device in another application according to an embodiment of the present invention. As shown in FIG. 5, light source 20 is placed at a side of the optical element 10, so that light is incident from that side of the optical element 10. As such, the light travels through a light guidance plate 30, to be converted into a direct downward light 21, to incident onto the light inlet face 100. The light guidance plate 30 can be made of Polystyrene (PS), Polycarbonate (PC), Polypropylene (PP.), or acrylic.

Figure 6:
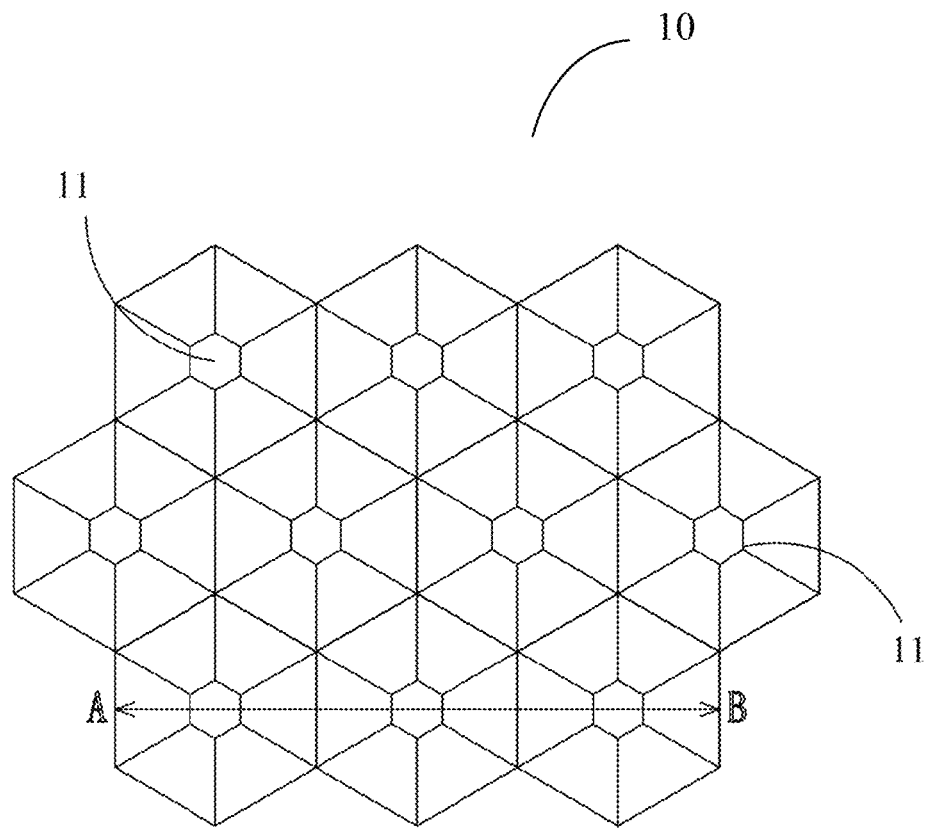
FIG. 6 is a top view of a light mask type optical device according to another embodiment of the present invention.

Then, refer to FIG. 6 for a top view of a light mask type optical device according to another embodiment of the present invention. As shown in FIG. 6, gratings of the grating structure are of a tetragon (refer to FIG. 2) or a hexagon shape.

Figure 7:
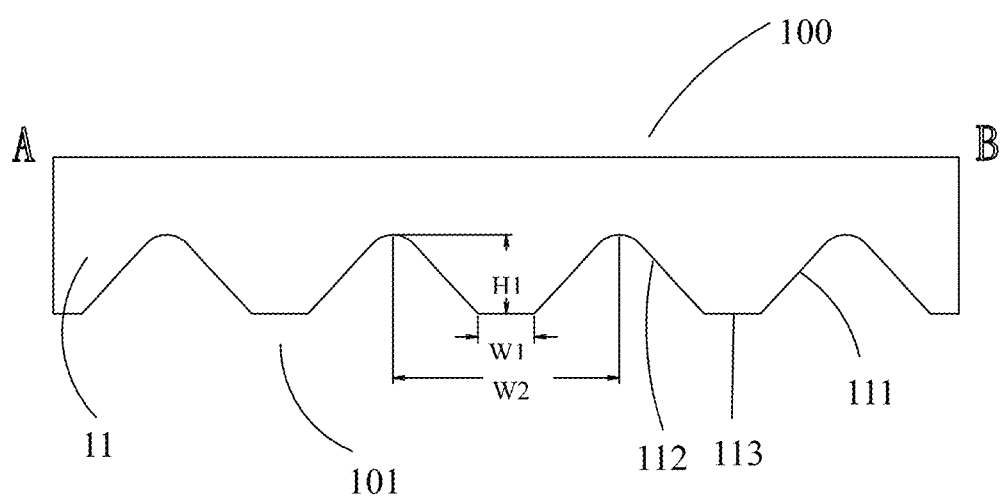
FIG. 7 is a cross section view of a light mask type optical device according to a further embodiment of the present invention.

Finally, refer to FIG. 7 for a cross section view of a light mask type optical device according to a further embodiment of the present invention. As shown in FIG. 7, the light inlet face 100 of the optical element 10 can be a plane surface, and not having the indent portion 1001 as shown in FIG. 3.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A light mask type optical device, comprising:
    an optical element, made of transparent plastic material, wherein the optical element includes:
        a light inlet face;
        a light outlet face opposite to the light inlet face; and
        a plurality of grating structures of micro meter (μm) scale, disposed on the light outlet face, wherein each of the grating structures includes a first slant face, a second slant face, and a plane surface located between the first slant face and the second slant face, to form into an inverted trapezoid;
    wherein, in application, light is emitted from a light source right above the light inlet face, a part of the light is output from the light outlet face, while the other part of the light is reflected by the first slant face and the second slant face to form into a circulating light, and that is combined with a direct downward light, to impinge onto the light outlet face, as such an incident light is enhanced by a sideway light, and to be concentrated to a center of the light outlet face, in achieving reduced glare and increased lumen.

2. The light mask type optical device as claimed in claim 1, wherein the optical element is formed by plastic material of transmittance over 60%, and is pressed into shape or ejected into shape.

3. The light mask type optical device as claimed in claim 1, wherein an angle formed by the first slant face and the second slant face is between 70 to 100 degrees.

4. The light mask type optical device as claimed in claim 1, wherein the grating structure of μm scale is formed having the following parameters: a first width W1 for a width of the plane surface being 0.15 mm-0.85 mm, a second width W2 for the width of the grating structure 11 being 1 mm-3 mm; the first height H1 for a height of the grating structures 11 being 0.35 mm-1.05 mm; while the second height H2 for the height of the indent portion being 0.02 mm-0.08 mm.

5. The light mask type optical device as claimed in claim 1, wherein the light inlet face is of a plane surface, or an arc structure having an indent opposite the grating structure.

6. The light mask type optical device as claimed in claim 4, wherein gratings of the grating structure are of a tetragon or a hexagon shape.

7. The light mask type optical device as claimed in claim 1, wherein the light is transmitted out of the light inlet face with transmission of 30%-50%.

8. The light mask type optical device as claimed in claim 1, wherein the light is transmitted out of the light outlet face with transmission of 80%-100%.

9. The light mask type optical device as claimed in claim 1, wherein the light inlet face and the light outlet face are both anti-glare atomized surfaces, to shield a light tube behind the optical element.

10. The light mask type optical device as claimed in claim 1, wherein the light is incident from a side of the optical element, and it travels through a light guidance plate made of transparent plastic material, to be transformed into the direct downward light and is incident onto the light inlet face.

* * * * *